(12) United States Patent
Ratakonda et al.

(10) Patent No.: US 7,305,031 B2
(45) Date of Patent: Dec. 4, 2007

(54) METHOD AND SYSTEM FOR THE ERROR RESILIENT TRANSMISSION OF PREDICTIVELY ENCODED SIGNALS

(75) Inventors: Krishna C. Ratakonda, Yorktown Heights, NY (US); Ashish Jagmohan, Champaign, IL (US)

(73) Assignee: International Business Machines Corporation, Armonk, NY (US)

( * ) Notice: Subject to any disclaimer, the term of this patent is extended or adjusted under 35 U.S.C. 154(b) by 720 days.

(21) Appl. No.: 10/767,596

(22) Filed: Jan. 29, 2004

(65) Prior Publication Data

US 2005/0169387 A1    Aug. 4, 2005

(51) Int. Cl.
*H04N 7/12*   (2006.01)
*H04N 11/02*  (2006.01)
(52) U.S. Cl. ............ 375/240; 375/240.03; 375/240.14; 375/240.18; 375/240.27
(58) Field of Classification Search ................ 375/240, 375/240.01, 240.02, 240.03, 240.12, 240.14, 375/240.18, 240.27
See application file for complete search history.

(56) References Cited

U.S. PATENT DOCUMENTS 6,256,346 B1 *   7/2001   Yamaguchi et al.   ... 375/240.12

* cited by examiner

*Primary Examiner*—David B. Lugo
(74) *Attorney, Agent, or Firm*—Scully, Scott, Murphy & Presser, P.C.; Daniel P. Morris, Esq.

(57) ABSTRACT

A system for the introduction of controlled correlation among multiple redundant representations of predictively encoded signals while avoiding predictive mismatch at a receiver when any given sub-set of the multiple representations is received. The system embodies a signal encoder and decoder. The decoder can comprise at least two signal adders for respectively receiving coefficient values and adding at least one predictive value transform to the coefficient value in order to generate and transmit a second set of coefficient values. The second set of coefficient values is subsequently received by a decoder means, wherein the decoder means transforms the received coefficient values and transmits the resultant coefficient values to a signal adder. Upon reception of the transformed coefficient values, the signal adder generates a third set of coefficient values; the third set of coefficients being used to reconstruct an approximate version of an encoded signal.

19 Claims, 9 Drawing Sheets

- X is frame to be encoded, P is
  - Decoder has one of 3 possible predictions
    - $P_0$ if both Channels received for P
    - $P_1$ if only Channel 1 received, $P_2$ if only Channel 2 received
- $(X-P_0) \neq (X-P_1) \neq (X-P_2)$ (Residual of Residual Technique)
  - Send which residual?

METHOD AND SYSTEM FOR THE ERROR RESILIENT TRANSMISSION OF PREDICTIVELY ENCODED SIGNALS

FIELD OF THE INVENTION

The present invention relates to error resilient transmission of predictively encoded sequences generally, and more particularly to those techniques of transmission that use multiple mutually correlated versions of the signal to increase error resilience.

BACKGROUND OF THE INVENTION

Currently, a range of communication channels (including the Internet and wireless channels) can be modeled as erasure channels. It is well known that the transmission of multiple mutually correlated but distinct versions of a given signal enhance the probability of the high fidelity reconstruction of the given signal. The underlying concept of such techniques is that the erasure channels have a more or less independent probability of failure, thus ensuring that the probability of the correct reception of at least a few channels is high even when the correct reception of a single channel is low.

The transmission of several exact replicas of a given signal over a channel may result in an explosion of bandwidth required to transmit the signal over the channel. As illustrated in FIG. 1, a solution to this problem involves transmitting several correlated but not exact replicas of the signal over the channel. When such a technique is employed the reconstruction fidelity of the signal improves with the number of copies of the signal that are correctly received. There are numerous publications relating to the above-mentioned signal transmission problem. Related inventions disclosed in literature include U.S. Pat. No. 6,330,370 issued to Goyal, et al. for the "Multiple description transform coding of images by the use of optimal transforms of arbitrary dimension" and U.S. Pat. No. 6,542,554 issued to Jafarkhani, et al. for "Multiple description trellis coded quantization".

Although such techniques have been shown to achieve good performance in practice, their extension to the case of predictively encoded signals, i.e., signal coding with memory, is not well understood. If the source signal sequence consists of predictively encoded symbols, as in the case of video coding, the additional problem of predictive mismatch is encountered.

Predictive mismatch refers to the scenario in which the reconstruction of the predictor symbol at the decoder is different from the predictor symbol used at the encoder. This causes the reconstruction of the predicted symbol to be erroneous and this effect propagates through the sequence. In the context of transmission of multiple correlated signals over independent channels, since the number of channel failures in transmitting the predictor symbol is unknown at the encoder, the decoder reconstruction of the predictor cannot be accurately reproduced at the encoder leading to a mismatch. Thus, the key issue to be solved in the case of predictively encoded symbols is circumventing the problem of predictive mismatch.

Layered coding is a coding technique that uses multiple channels for the transmission of predictively coded information in the presence of channel erasures. However, layered coding requires that one particular channel, which is typically referred to as the 'base channel', has to be received with fidelity in order for a scheme to succeed. The present invention does not rely on such restrictions and therefore possesses greater general applicability. The resultant problem when two correlated representations are employed is illustrated in FIG. 2.

The residual-of-residuals (RoR) technique addresses this problem by sending a correction signal that partially removes predictive mismatch. However, the increase in rate incurred in transmitting the correction signal is quite high. U.S. Pat. No. 6,556,624 to Orchard, et al. for a "Method and apparatus for accomplishing multiple description coding for video" discloses an invention that utilizes a similar technique for video transmission. It must be noted that this technique, in direct contrast to the present invention, requires the transmission of at least one additional correction signal to accomplish its objectives.

The invention disclosed in U.S. Pat. No. 6,611,530 to Apostolopoulos for "Video communication using multiple streams" discloses a method for transmitting predictively encoded video using multiple streams, such that errors in one or more streams does not destroy the entire video stream but only reduces the play back frame rate. Conversly, the utilization of the present invention does not lead to a reduction in the frame rate in the event of the loss of one or more channels.

The present invention eliminates predictive mismatch while avoiding transmission of a correction signal.

SUMMARY OF THE INVENTION

The disclosed invention provides method, system and computer program products for introducing controlled correlation among multiple redundant representations of a predictively encoded signal in order to reduce predictive mismatch at the receiver when any given sub-set of the multiple representations is received.

An embodiment of the present invention comprises an encoding system for the transmission of predictively encoded signals over a plurality of channels. The system comprises a signal source, wherein the signal source transmits a signal over a channel comprising at least two transmission channels. Further, at least two signal adding means are implemented wherein each adding means receives the signal transmitted from the signal source and forms a coefficient by subtracting a differing predictive value from the signal and outputting a respective coefficient value. At least two signal quantizing means are used for receiving differing coefficient values from the signal adding means, wherein the quantizing means perform the operations of quantizing the received coefficient values and outputting the resultant values. Lastly, at least two encoding means are implemented for receiving the coefficients from the signal quantizing means, wherein the encoder means performs the operation of transforming the received coefficients and transmitting at least two resulting scalar coefficient values, where the number of the transmitted scalar coefficients is less than the number of coefficients values generated by the transformation, to a decoding system embodied within the present invention.

Further embodied is a decoding system for the decoding of predictively encoded signals that are received over a plurality of channels, wherein more than one subset of the channels can be used to reconstruct an approximate version of the originally encoded signal. The decoding system comprises a central decoding means, wherein the central decoder means receives a first set of coefficient values from at least two channels. The central decoding means comprises at least two signal adding means for respectively receiving the scalar coefficient values and then adding at least one value which is a transform of the difference between two predictive values to the coefficient value in order to generate a second set of coefficient values. Further, the central decoder comprises a decoding means for receiving the coefficient values transmitted from the signal adding means. The decoding means transforms and transmits a second set of coefficient values to an additional signal adding means, wherein the signal adding means further generates and outputs a third set of coefficient values; the third set of coefficients being used to reconstruct an approximate version of an encoded sequence of symbols.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION

One or more exemplary embodiments of the invention are described below in detail. The disclosed embodiments are intended to be illustrative only since numerous modifications and variations therein will be apparent to those of ordinary skill in the art. In reference to the drawings, like numbers will indicate like parts continuously throughout the views.

Disclosed are embodiments of the present invention in which a baseline scheme of multiple description correlating transforms (MDCT) are modified to address the problem of predictive mismatch as applicable to transmission of predictively encoded sequences. However, it should be understood that the technique can be modified to apply to many other schemes for transmitting multiple correlated descriptions over erasure channels. The disclosed embodiments of the present invention use two representations of a signal, however, the present invention can be modified to be made applicable to cases when more than two redundant representations are utilized.

Figure 1:
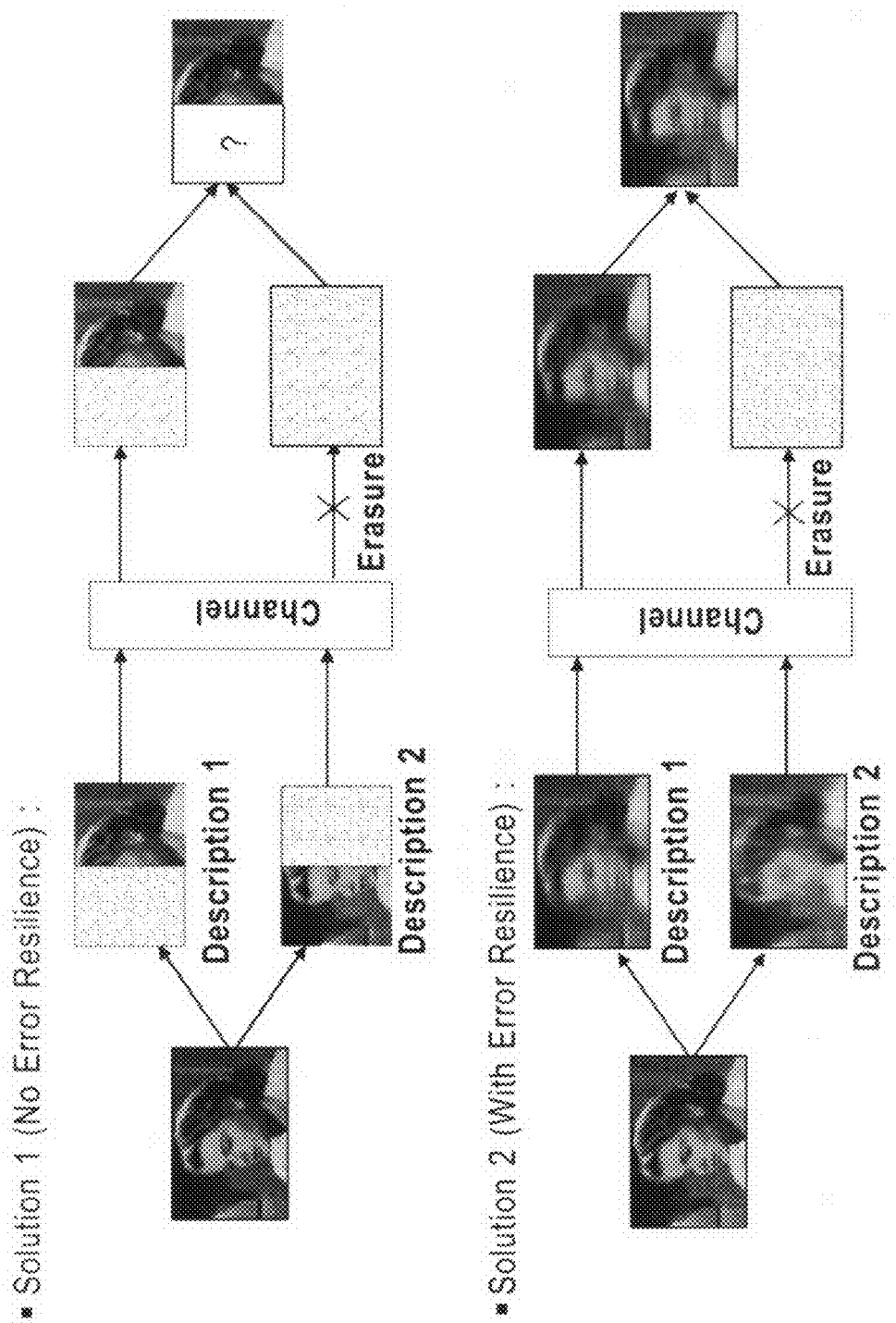
FIG. 1 is pictorial diagram demonstrating the transmission of multiple correlated descriptions over erasure channels.
Figure 2:
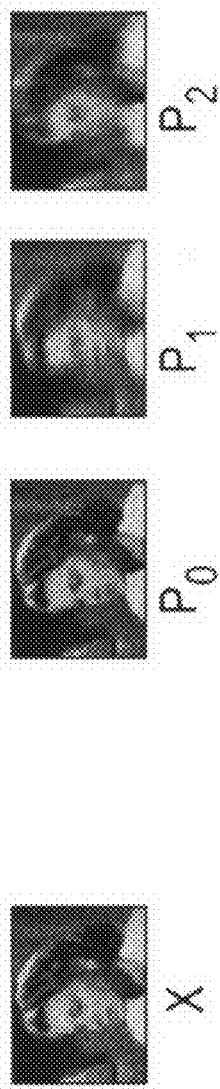
FIG. 2 is a pictorial diagram demonstrating the problem of predictive mismatch.
Figure 3:
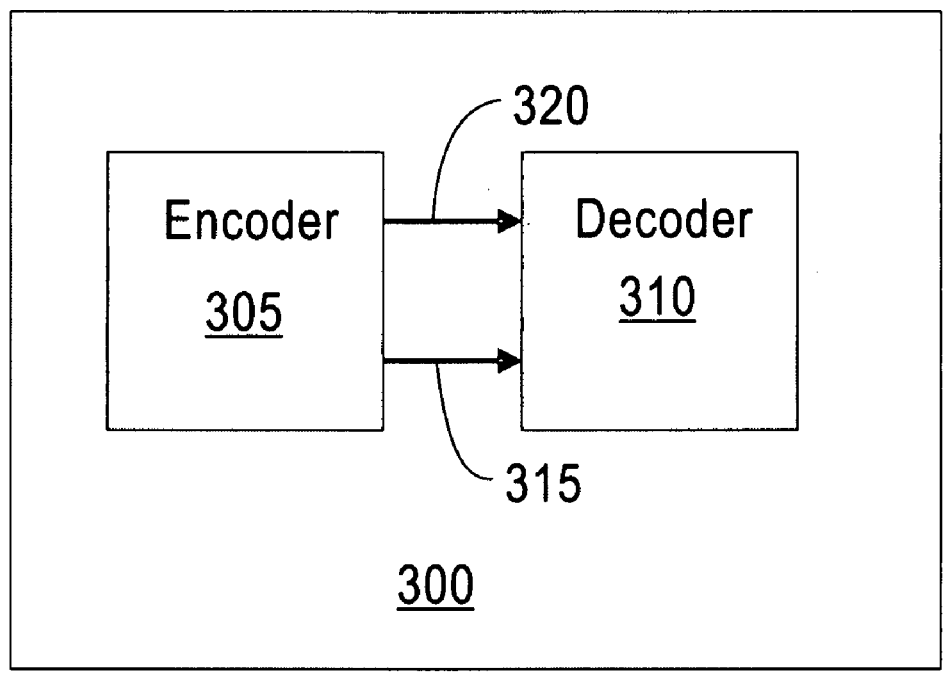
FIG. 3 is a diagram illustrating an exemplary embodiment of the current invention.

The present invention is initially described in reference to FIG. 3. FIG. 3 illustrates a system 300 for the introduction of controlled correlation among multiple redundant representations of a predictively encoded signal. The present invention avoids predictive mismatch at a receiver when any given sub-set of the multiple representations is received. The illustrated embodiment of the present invention comprises an encoding device 305 and a decoding device 310. The encoding device 305 and the decoding device 310 are in communication via transmission channels 315 and 320.

It is assumed in the following descriptions that a signal comprising a two-coefficient vector X is being transmitted over two channels using the prediction information from previously encoded signals. In this context, the following notation is introduced wherein $P_0$ is the prediction value of X if information from both channels is received, $P_1$ is the prediction value if only the signal from a first channel is received and $P_2$ is the prediction value if only the signal from a second channel is received. $[A]_\Delta$ is representative of the vector A after it is quantized with a step size $\Delta$.

Further, T is representative of a 2×2 matrix $$\begin{bmatrix} a & b \\ c & d \end{bmatrix},$$

which is used to introduce a controlled amount of correlation between the coefficients that are to be transmitted given the source signal statistics. In the specified context if A is a 2×1 vector, $[A]_1^T$ is then used to denote the first coefficient of the vector TA.

In general T may not be orthogonal, thus it may be better to implement the transform and the quantization steps in tandem by the use lifting techniques to aid in the reduction quantization error. In this context, $\hat{T}$ refers to a discrete version of T thereby combing the transform and the quantization steps.

Further, R represents the general linear minimum mean squared error (LMMSE) predictor of the coefficients of X. Thus, if $[A]_1$ is the first coefficient of vector A, then $[A]_1^R$ represents the LMMSE estimate of both coefficients of X given $[A]_1$. The resultant X is communicated by the transmittal of the scalar coefficients $S_1 = \{X-P_0\}_{\Delta,1}^{\hat{T}} + \{P_0-P_1\}_{\Delta,1}^{\hat{T}}$, $S_1 \in R$ on a first channel and $S_2 = \{X-P_0\}_{\Delta,2}^{\hat{T}} + \{P_0-P_2\}_{\Delta,2}^{\hat{T}}$, $S_2 \in R$ on a second channel.

Figure 4:
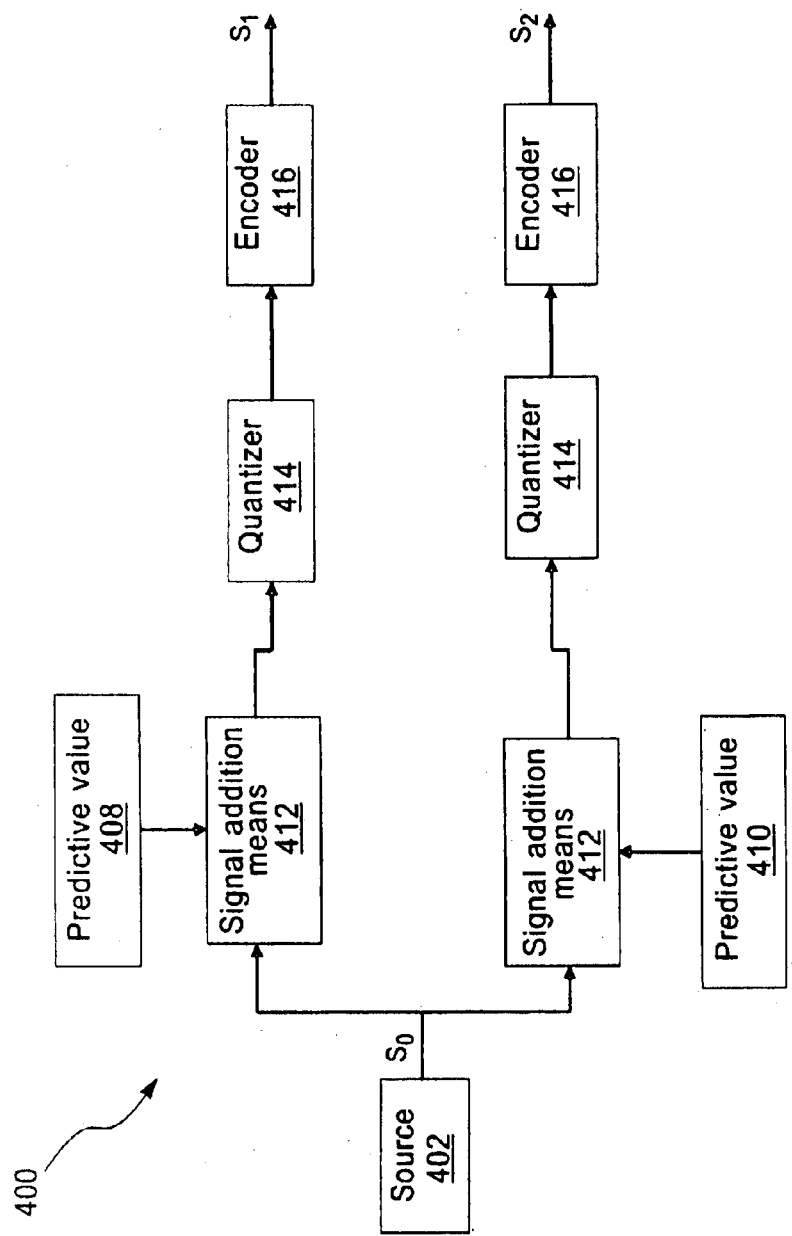
FIG. 4 is a diagram illustrating an embodiment of an encoder that may be utilized within embodiments of the present invention.

FIG. 4 illustrates an exemplary embodiment of an encoding system 400 for transmitting predictively encoded signals over a plurality of channels. The system comprises a signal source 402, wherein the signal source 402 transmits a signal $S_0$ over a channel comprising at least two transmission channels. The signal $S_0$ is received at at least two signal adding means 412, each signal adding means 412 receives the signal $S_0$ and forms a coefficient by subtracting a differing predictive value 408, 410 from the signal $S_0$ and outputs the respective coefficient values to a signal quantizing means 414.

The quantizing means 414 performs the operation of quantizing the received coefficient values and outputting a resultant value to an encoding means 416, wherein the encoding means 416 performs the operation of transforming the received coefficient value and transmitting the respective resulting scalar coefficient values $S_1 = \{X-P_0\}_{\Delta,1}^{\hat{T}} + \{P_0-P_1\}_{\Delta,1}^{\hat{T},S} \in R$ on a first channel and $S^2 = \{X-P_0\}_{\Delta,2}^{\hat{T}} + \{P_0-P_2\}_{\Delta,2}^{\hat{T}}, S_2 \in R$ on a second channel.

Figure 5:
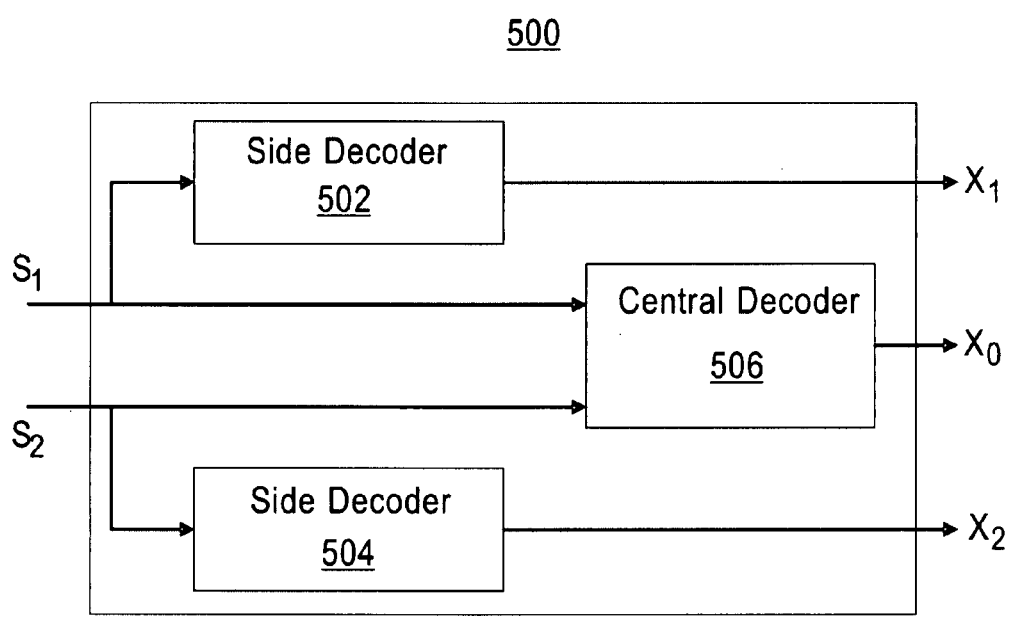
FIG. 5 is a diagram illustrating an embodiment of a decoder system that may be utilized within embodiments of the present invention.

When both scalar coefficients are received at a decoder 500 (as illustrated in FIG. 5), reconstruction of the encoded signal is accomplished as follows.

$$E = \hat{T}^{-1} \begin{bmatrix} S_1 - \{P_0 - P_1\}_{\Delta,1}^{\hat{T}} \\ S_2 - \{P_0 - P_2\}_{\Delta,2}^{\hat{T}} \end{bmatrix} \quad \text{(Equation 1)}$$

$$= \hat{T}^{-1} \begin{bmatrix} \{X - P_0\}_{\Delta,1}^{\hat{T}} \\ \{X - P_0\}_{\Delta,2}^{\hat{T}} \end{bmatrix} \quad \text{(Equation 2)}$$

$$= (X - P_0)_\Delta \quad \text{(Equation 3)}$$

$$\hat{X}_0 = P_0 + E = [X]\Delta \quad \text{(Equation 4)}$$

The computation of E makes use of the invertibility of the discrete-domain transform $\hat{T}$ and the equality of equation 4 follows since $P_0 \in \Delta Z^2$. The key concept being $P_0$, $P_1$ and $P_2$ are all present at the decoder 500 if both scalar coefficient values $S_1$ and $S_2$ are received. For this reason, the decoder 500 can compute E completely from $S_1$, $S_2$ and information that is already available at the decoder 500. Summarily, if both $S_1$ and $S_2$ are received at the decoder 500, it is possible to reconstruct the signal X such that the only distortion in the transmitted signal is the quantization distortion.

However, in the instance when only one of the two channels is received the reconstruction hinges on the fact that the quasi-linear discrete-domain transform $\hat{T}$ approximates a linear continuous-domain transform T for small quantization step size. For this reason, T and $\hat{T}$ are related as follows:

$$\hat{T}(x) = [T_1[T_2[T_3 x]\Delta]\Delta]\Delta \quad \text{(Equation 5)}$$

$$T = T_1 T_2 T_3$$

Then the following holds $$\|\hat{T}(x) - T(x)\|_\infty \leq (1 + \max\{|b|, |a| + |1 + ab|\}) \frac{\Delta}{2} \quad \text{(Equation 6)}$$

$$x \in \Delta Z^2$$

Thus $$S_1 = \{X - P_0\}_{\Delta,1}^{\hat{T}} + \{P_0 - P_1\}_{\Delta,1}^{\hat{T}} \quad \text{(Equation 7)}$$

$$\approx \{X - P_0\}_{\Delta,1}^{T} + \{P_0 - P_1\}_{\Delta,1}^{T}$$

$$= \{X - P_1\}_{\Delta,1}^{\hat{T}}$$

Where the first step follows from equation 6 and the second step follows from the linearity of the transform T. Now, assuming only a signal $S_1$ is received, the one-channel reconstruction can be achieved by the equation $$\hat{X} = \{X - P_1\}_{\Delta,1}^{R} + P_1 \quad \text{(Equation 8)}$$

The one-channel reconstruction obtained is distorted since only one description of the residual $(X-P_1)$ is used in the reconstruction of the signal X. However, predictive mismatch is avoided since the predictor used at the encoder ($P_1$ in the above case) is the same as the predictor present at the decoder 500.

Figure 5A:
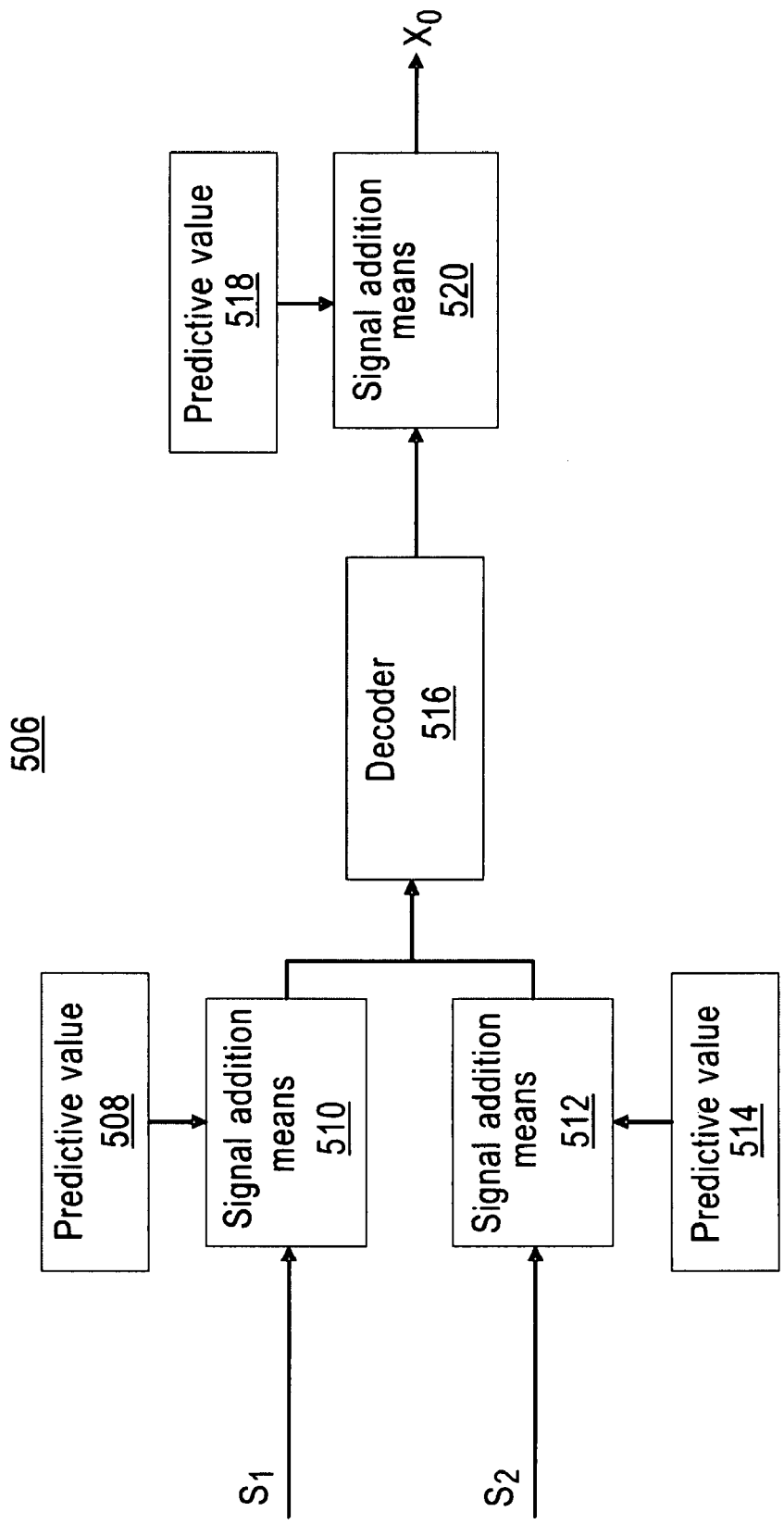
FIG. 5A is a diagram illustrating a central decoder that may be utilized within embodiments of the present invention.

As referenced above, further embodiment of the present invention comprises a decoding system 500 for decoding a predictively encoded signal that is transmitted over a plurality of channels, wherein more than one subset of the channels can be used to reconstruct an approximate version of the encoded signal. As illustrated in FIGS. 5 and 5A, the decoding system 500 comprises a central decoding means 506, wherein the central decoder means 506 receives a first set of scalar coefficient values $S_1$ and $S_2$ from at least two channels. Further, the central decoding means 506 comprises at least two signal adding means 510, 512 (FIG. 5A) for respectively receiving the scalar coefficient values and adding at least one predictive value transform 508, 514 (which are transforms of the difference between two predictive values) to the coefficient value in order to generate and transmit a second set of coefficient values. A decoding means 516 is used to receive the coefficient values transmitted from the adding means 510, 512 wherein the decoding means 516 transforms and transmits the second set of coefficient values to a signal adding means 520 where the signal adding means 520 in conjunction with a predictive value transform 518 further generate a third set of coefficient values which are reconstructed as the signal $X_0$.

Figure 5B:
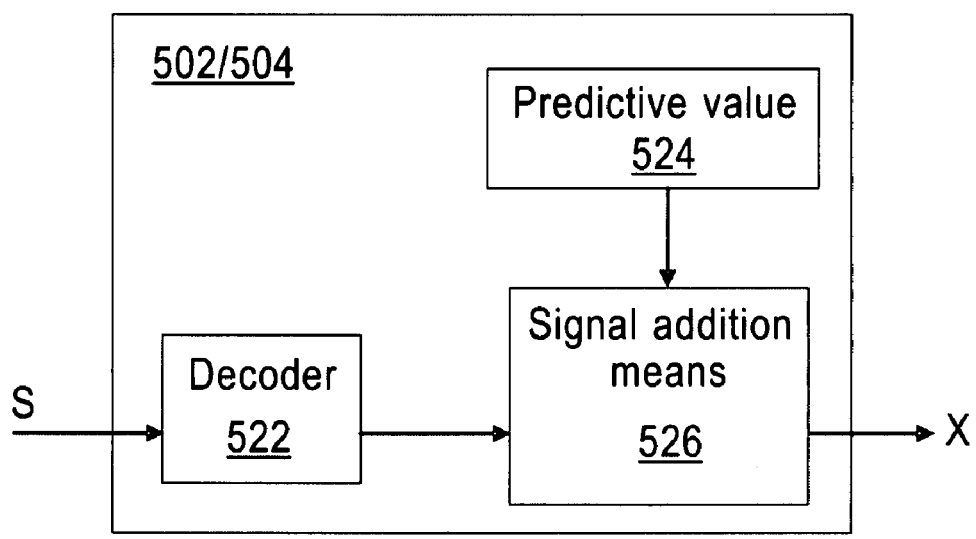
FIG. 5B is a diagram illustrating a side decoder that may be utilized within embodiments of the present invention.

With reference to FIGS. 5 and 5B, further aspects of this embodiment comprise two side decoders 502 and 504, wherein the side decoders receive the first set of coefficient values $S_1$ or $S_2$ transmitted from the encoder 305. The side decoders 502 and 504 comprise a decoding means 522 for transforming the coefficients received from the encoder 305. Subsequently, the decoding means 522 transmits the transformed coefficients to a signal adding means 526, wherein a second set of coefficients is generated by adding a predictive value 524 of the first coefficient values to the first coefficient and the signal $X_1$ or $X_2$ are reconstructed depending upon the scalar coefficient $S_1$ or $S_2$ transmitted from the encoder 305 that are processed by the side decoders 502, 504.

Figure 6:
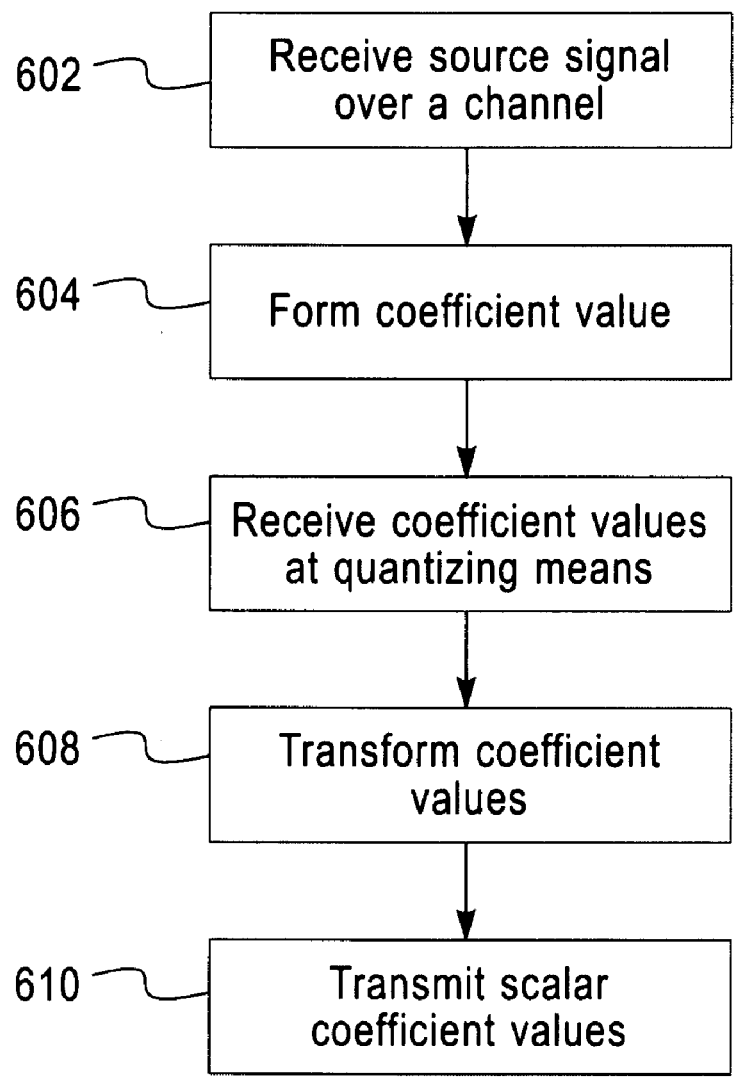
FIG. 6 is a flow diagram illustrating a method for encoding a predictively encoded signal.

FIG. 6, illustrates a method for the encoding and transmittal of predictively encoded signals over a plurality of channels. The method comprises the steps of receiving a source signal over a channel at step 602, wherein the channel comprises at least two channels, and at step 604 forming a coefficient by subtracting a differing predictive value from the signal and outputting the respective coefficient values. At step 606 the coefficient values output at step 604 are received at at least two quantizing means, wherein the quantizing means perform the operations of quantizing the received coefficient values and outputting the resultant values. At step 608, the coefficients are transmitted from the quantizing means to at least two encoders, wherein the encoders perform the operation of transforming the received coefficients and at step 610 transmitting the resulting scalar coefficient values $S_1 = \{X-P_0\}_{\Delta,1}^{\hat{T}} + \{P_0-P_1\}_{\Delta,1}^{\hat{T}}$, $S_1 \in R$ on a first channel and $S_2 = \{X-P_0\}_{\Delta,2}^{\hat{T}} + \{P_0-P_2\}_{\Delta,2}^{\hat{T}}$, $S_2 \in R$ on a second channel.

Figure 7:
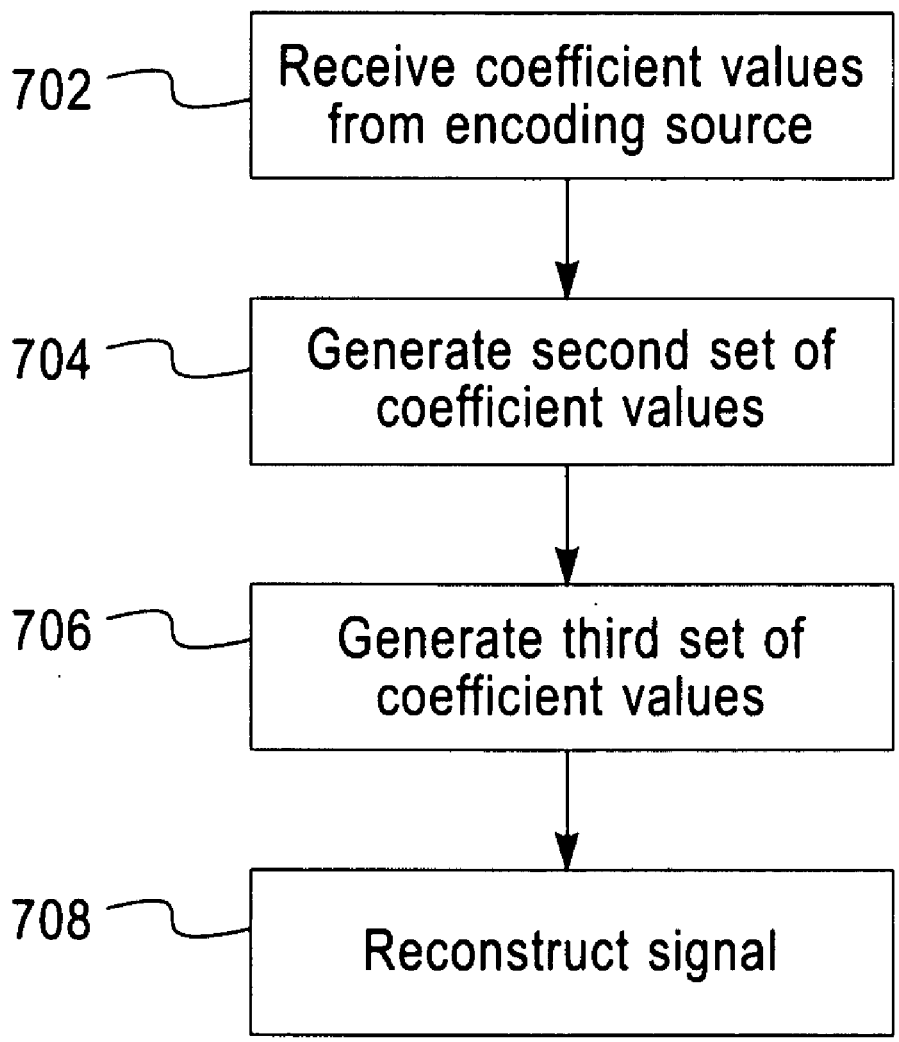
FIG. 7 is a flow diagram is a flow diagram illustrating a method for decoding a predictively encoded signal.

FIG. 7 illustrates another embodiment of the preset invention that comprises a method for decoding a predictively encoded signal transmitted over a plurality of channels, such that more than one subset of the channels can be used to reconstruct an approximate version of the sequence. We find that at step 702 coefficients from more than one channel are received from an encoding source. At step 704, a second set of coefficients is generated by taking a function of the difference of predicted values generated from information from two different subsets of the total number of channels. A third set of coefficients is next generated at step 706 by either adding a function of the received coefficients from step 702 to corresponding coefficients from step 704 or directly copying a function of the coefficients from step 702 without any addition, provided that at least one coefficient in this third set is generated by the process of addition. Finally, at step 708 an approximate version of the transmitted signal is reconstructed by further decoding the third set of coefficients from step 706.

The present invention additionally embodies a computer program product that includes a computer readable medium useable by a processor, the medium having stored thereon a sequence of instructions which, when executed by the processor causes the processor to decode a predictively encoded signal that has been transmitted over a plurality of channels, such that more than one subset of the channels can be used to reconstruct an approximate version of the sequence.

The computer program product executes the steps of receiving coefficients from at least two channels and subsequently forming a second set of coefficients in which each coefficient is generated by taking a function of the difference of predicted values generated using information from two different subsets of the total number of channels. The computer program product next generates a third set of coefficients by either adding a function of the received coefficients to corresponding coefficients from the second set of coefficients or directly copying a function of the coefficients from the received coefficients without any addition, provided that at least one coefficient in this third set is generated by the process of addition. Lastly, the computer program product reconstructs an approximate version of the transmitted signal by further decoding the third set of coefficients.

A yet further embodiment of the present invention comprises a computer program product that includes a computer readable medium useable by a processor, the medium having stored thereon a sequence of instructions which, when executed by the processor, causes the processor to encode and transmit predictively encoded signals over a plurality of channels. The computer program product executes the steps of receiving a source signal over a channel and forming a coefficient by subtracting a differing predictive value from the signal and outputting the respective coefficient values. Next the computer program product performs the operation of quantizing the received coefficient values and outputting the resultant scalar coefficient value $S_1=\{X-P_0\}_{A,1}^T+\{P_0-P_1\}_{A,1}^T$, $S_1 \epsilon R$ on a first channel and $S^2=\{X-P_0\}_{A,2}^T+\{P_0-P_2\}_{A,2}^T$, $S_2 \epsilon R$ second channel.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for the introduction of controlled correlation among multiple redundant representations of a predictively encoded signal in order to reduce predictive mismatch at a receiver when any given sub-set of the multiple representations is received, comprising:

an encoding device comprising:

A) a signal source, the signal source transmitting a signal over a channel, wherein the channel comprises at least two transmission channels;

B) at least two signal adding means wherein each adding means receives the signal transmitted from the signal source and forms a coefficient by subtracting a differing predictive value from the signal and outputting the respective coefficient values;

C) at least two signal quantizing means for receiving a differing coefficient value from the adding means, wherein the quantizing means perform the operations of quantizing the received coefficient values and outputting resultant values;

D) at least two encoder means for receiving the coefficients from the signal quantizing means, wherein the encoder performs the operation of transforming the received coefficients and transmitting the resulting scalar coefficient values, where the number of the transmitted scalar coefficients is less than the number of coefficients values generated by the transformation; and a decoding device, wherein the decoding device receives a first set of coefficient values from the encoding device, the decoding device comprising:

A) at least two signal adding means for respectively receiving the coefficient values and adding at least one value which is a transform of the difference between two predictive values to the coefficient value in order to generate a second set of coefficient values;

B) a decoding means for receiving the coefficient values transmitted from the adding means wherein the decoding means transforms and transmits the second set of coefficient values;

C) a signal adding means for receiving the coefficients generated by the decoding means, wherein the adding means further generates a third set of coefficient values, the third set of coefficients being used to reconstruct an approximate version of an encoded signal.

2. An encoding system for transmitting predictively encoded signals over a plurality of channels, the system comprising:

A) a signal source, the signal source transmitting a signal over a channel, wherein the channel comprises at least two transmission channels:

B) at least two signal adding means wherein each adding means receives the signal transmitted from the signal source and forms a coefficient by subtracting a differing predictive value from the signal and outputting the respective coefficient values;

C) at least two signal quantizing means for receiving a differing coefficient value from the signal adding means, wherein the quantizing means perform the operations of quantizing the received coefficient values and outputting resultant values:

D) at least two encoder means for receiving the coefficients from the signal quantizing means, wherein the encoder performs the operation of transforming the received coefficients and transmitting the resulting scalar coefficient values, where the number of the transmitted scalar coefficients is less Than the number of coefficients values generated by the transformation, wherein the transmitted scalar coefficient values are $S^1=\{X-P_0\}_{A,1}^T+\{P_0-P_1\}_{A,1}^T$, $S_1 \epsilon R$ on a first channel and $S_2=\{X-P_0\}_{A,2}^T+\{P_0-P_2\}_{A,2}^T$, $S_2 \epsilon R$ on a second channel and X represents a two coefficient vector of the signal from the signal source, $P_0$ is a prediction value of X comprised of information from at least a first and second channel, $P_1$ is a prediction value of X comprised of information received from only a first channel, $P_2$ is a prediction value of X comprised of information received from only a second channel and R is the general linear minimum mean squared error predictor of the coefficients of X.

3. A decoding system for decoding a predictively encoded sequence of symbols transmitted over a plurality of channels, wherein more than one subset of the channels can be used to reconstruct an approximate version of the encoded sequence of symbols, the system comprising:
- a central decoding means, wherein the central decoder means receives a first set of coefficient values from at least two channels, the central decoding means comprising:
  - a) at least two signal adding means for respectively receiving the first set of coefficient values and adding at least one value which is a transform of the difference between two predictive values to the coefficient values in order to generate a second set of coefficient values;
  - b) a decoding means for receiving the coefficient values transmitted from the adding means wherein the decoding means transforms and transmits the second set of coefficient values;
  - c) a signal adding means for receiving the coefficients generated by the decoding means, wherein the adding means further generates a third set of coefficient values, the third set of coefficients being used to reconstruct an approximate version of an encoded signal.

4. The decoding system of claim 3, further comprising at least two side decoders.

5. The decoding system of claim 4, wherein the side decoders receive the first set of coefficient values transmitted from one of the at least two channels.

6. The decoding system of claim 5, wherein the side decoders comprise a decoding means, the decoding means transforms the first set of coefficients received from the channels.

7. The decoding system of claim 6, wherein the side decoder further comprises a signal adding means for receiving the coefficients generated by the decoding means and subsequently generating a second set of coefficients by adding a function of the received first set of coefficient values to the first set of coefficient values.

8. A method for decoding a predictively encoded sequence of symbols transmitted over a plurality of channels, such that more than one subset of the channels can be used to reconstruct an approximate version of the sequence, the method comprising the steps of:
- A) receiving coefficients from at least two channels;
- B) forming a second set of coefficients in which each coefficient is generated by taking a function of the difference of predicted values generated using information from two different subsets of the total number of channels;
- C) generating a third set of coefficients by adding a function of the received coefficients from step A to corresponding coefficients from step B;
- D) reconstructing an approximate version of the transmitted signal by further decoding the third set of coefficienis from step C.

9. The method of claim 8, further comprising the step of receiving a first set of coefficients at least two side decoders.

10. The method of claim 9, further comprising the step of the side decoders transforming the first set of coefficients received from the channels and generating a second set of coefficients by adding a fi.mction of the received coefficients from the first set of coefficient values to the first set of coefficient values.

11. The method of claim 10, further comprising the step of reconstructing an approximate version of the transmitted signal by further decoding the second set of coefficients.

12. The method of claim 8, wherein the step of generating a third set of coefficients is accomplished by directly copying a function of the coefficients from step A without any addition.

13. A method for encoding and transmitting predictively encoded sequences of symbols over a plurality of channels, the method comprising the steps of:
- A) receiving a source signal from at least two channels;
- B) forming a coefficient by subtracting a differing predictive value from the signal and outputting the respective coefficient values;
- C) receiving a differing coefficient value at at least two quantizing means, wherein the quantizing means perform the operations of quantizing the received coefficient values and outputting the resultant values;
- D) transmitting the coefficients from to quantizing means to at least two encoders, wherein the encoders perform the operation of transforming the receive coefficients and transmitting the resulting scalar coefficient values, where the number of the transmitted scalar coefficients is less than then the number of coefficients values generated by the transformation, wherein the transmitted scalar coefficient values are $S_1=\{X-P_0\}_{A,1}{}^T+\{P_0-P_1\}_{A,1}{}^T$, $S_1 \in R$ on a first channel and $S^2=\{X-P_0\}_{A,2}{}^T+\{P_0-P_2\}_{A,2}{}^T$, $S_2 \in R$ on a second channel and X represents a two coefficient vector of the signal from the signal source, $P_0$ is a prediction value of X comprised of information from at least a first and second channel, $P_1$ is a prediction value of X comprised of information received from only a first channel, $P_2$ is a prediction value of X comprised of information received from only a second channel and R is the general linear minimum mean squared error predictor of the coefficients of X.

14. A computer program product that includes a computer readable medium useable by a processor, the medium having stored thereon a sequence of instructions which, when executed by the processor, causes the processor to decode a predictively encoded sequence of symbols transmitted over a plurality of channels, such that more than one subset of the channels can be used to reconstruct an approximate version of the sequence, wherein the computer program product executes the steps of:
- A) receiving coefficients from at least two channels;
- B) forming a second set of coefficients in which each coefficient is generated by taking a function of the difference of predicted values generated using information from two different subsets of the total number of channels;
- C) generating a third set of coefficients by adding a function of the received coefficients from step A to corresponding coefficients from step B;
- D) reconstructing an approximate version of the transmitted signal by further decoding the third set of coefficients from step C.

15. The computer program product of claim 14, further comprising the step of receiving a first set of coefficients from a channel.

16. The computer program product of claim 15, further comprising the step of transforming the first set of coefficients received from the channel and generating a second set of coefficients by adding a function of the received coefficients from the first set of coefficient values to the first set of coefficient values.

17. The computer program product of claim 16, further comprising the step of reconstructing an approximate version of the transmitted signal by further decoding the second set of coefficients.

18. The computer program product of claim 14, wherein the third set of coefficients is generated by directly copying a function of the coefficients from step A without any addition.

19. A computer program product that includes a computer readable medium useable by a processor, the medium having stored thereon a sequence of instructions which, when executed by the processor, causes the processor to encode and transmit predictively encoded sequences of symbols over a plurality of channels, wherein the computer program product executes the steps of:

A) receiving a source signal from at least two channels:

B) forming a coefficient by subtracting a differing predictive value from the signal and outputting the respective coefficient values;

C) quantizing the coefficient values and outputting the resultant values;

D) transforming the quantized coefficients and transmitting the resulting scalar coefficient values, where the number of the transmitted scalar coefficients is less than then the number of coefficients values generated by the transformation, wherein the transmitted scalar coefficient values are $S_1 = \{X-P_0\}_{A,1}^T + \{P_0-P_1\}_{A,1}^T$, $S_1 \epsilon R$ on a first channel and $S_2 = \{X-P_0\}_{A,2}^T + \{P_0-P_2\}_{A,2}^T$, $S_1 \epsilon R$ second channel and X represents a two coefficient vector of the signal from the signal source, $P_0$ is a prediction value of X comprised of information from at least a first and second channel, $P_1$ is a prediction value of X comprised of information received from only a first channel $P_2$ is a prediction value of X comprised of information received from only a second channel and R is the general linear minimum mean squared error predictor of the coefficients of X.

\* \* \* \* \*